(12) United States Patent
Bosecker et al.

(10) Patent No.: US 9,371,012 B2
(45) Date of Patent: Jun. 21, 2016

(54) SPINDLE DRIVE FOR LONGITUDINALLY ADJUSTING A MOTOR VEHICLE SEAT

(71) Applicant: Brose Fahrzeugteile GmbH & Co. KG, Coburg, Coburg (DE)

(72) Inventors: Stefan Bosecker, Sonneberg (DE); Wolfgang Suck, Coburg (DE); Florian Lipp, Shanghai (CN); Andrea Bauersachs, Ebersdorf (DE); Sebastian Eichhorn, Unterweissbach (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 14/750,749

(22) Filed: Jun. 25, 2015

(65) Prior Publication Data

US 2015/0336476 A1 Nov. 26, 2015

Related U.S. Application Data

(62) Division of application No. 13/201,203, filed as application No. PCT/EP2010/051729 on Feb. 11, 2010, now Pat. No. 9,139,110.

(30) Foreign Application Priority Data

Feb. 11, 2009 (DE) .................... 20 2009 001 847 U

(51) Int. Cl.
| | | |
|---|---|---|
| *F16H 3/06* | (2006.01) | |
| *B60N 2/06* | (2006.01) | |
| *B60N 2/42* | (2006.01) | |
| *F16H 1/16* | (2006.01) | |
| *F16H 25/24* | (2006.01) | |
| *F16H 25/20* | (2006.01) | |

(52) U.S. Cl.
CPC .............. *B60N 2/067* (2013.01); *B60N 2/4214* (2013.01); *F16H 1/16* (2013.01); *F16H 25/2472* (2013.01); *F16H 2025/209* (2013.01); *Y10T 74/18576* (2015.01); *Y10T 74/18648* (2015.01)

(58) Field of Classification Search
CPC ........ B60N 2/067; B60N 2/4214; F16H 1/16; F16H 25/2472; F16H 2025/209
USPC .............. 74/89.32, 89.3, 89.33, 89.36, 89.26, 74/424.71, 424.72, 424.75, 424.79, 425
See application file for complete search history.

(56) References Cited

U.S. PATENT DOCUMENTS

| | | | |
|---|---|---|---|
| 3,323,777 | A | 6/1967 | McMullen |
| 4,790,202 | A | 12/1988 | Hayashi et al. |

(Continued)

FOREIGN PATENT DOCUMENTS

| | | |
|---|---|---|
| CN | 1494496 A | 5/2004 |
| CN | 1670401 A | 9/2005 |

(Continued)

OTHER PUBLICATIONS

English translation of International Preliminary Report on Patentability dated Aug. 16, 2011 for corresponding International Application No. PCT/EP2010/051729, 13 pages.

(Continued)

*Primary Examiner* — William Kelleher
*Assistant Examiner* — Zakaria Elahmadi
(74) *Attorney, Agent, or Firm* — Lewis Roca Rothgerber Christie LLP

(57) ABSTRACT

A spindle drive for longitudinally adjusting a motor vehicle seat is provided. The spindle drive comprising an adjustment rail that can be longitudinally adjusted relative to a body mounted rail and an adjusting mechanism that includes a driving worm connected to a driving device as well as a spindle nut, the external teeth of which mesh with the external teeth of the driving worm, and the internal teeth of which mesh with the external thread of a spindle. The spindle nut is formed by a hybrid spindle nut that has a functional part, which is located in the force flux between the driving worm and the spindle, and at least one strengthening part, deflecting crash forces from the adjustment rail into the spindle.

10 Claims, 12 Drawing Sheets

(56) References Cited

U.S. PATENT DOCUMENTS

| | | | |
|---|---|---|---|
| 4,802,374 A | 2/1989 | Hamelin et al. | |
| 4,872,903 A | 10/1989 | Periou | |
| 4,966,045 A | 10/1990 | Harney | |
| 5,048,786 A | 9/1991 | Tanaka et al. | |
| 5,150,872 A | 9/1992 | Isomura | |
| 5,613,402 A | 3/1997 | Gauger et al. | |
| 5,711,184 A | 1/1998 | Pryor et al. | |
| 5,797,293 A | 8/1998 | Chaban | |
| 6,138,974 A | 10/2000 | Okada et al. | |
| 6,158,720 A | 12/2000 | Patrick et al. | |
| 6,260,922 B1 | 7/2001 | Frohnhaus et al. | |
| 6,575,421 B1 | 6/2003 | Houston et al. | |
| 6,808,233 B2 | 10/2004 | Mallard | |
| 6,851,330 B2 | 2/2005 | Buchanan et al. | |
| 6,971,620 B2 | 12/2005 | Moradell et al. | |
| 7,051,986 B1 | 5/2006 | Taubmann et al. | |
| 7,152,496 B2 | 12/2006 | Chen et al. | |
| 7,340,974 B2 * | 3/2008 | Landskron | B60N 2/067 248/424 |
| 7,437,962 B2 | 10/2008 | Taubmann et al. | |
| 7,484,787 B2 | 2/2009 | Hofschulte et al. | |
| 7,562,601 B2 | 7/2009 | Kurokawa et al. | |
| 7,640,822 B2 * | 1/2010 | Suzuki | F16H 55/22 74/425 |
| 7,681,470 B2 | 3/2010 | Maiss | |
| 7,685,898 B2 | 3/2010 | Lykkegaard | |
| 7,712,391 B2 * | 5/2010 | Hofschulte | B60N 2/0232 74/425 |
| 8,113,074 B2 | 2/2012 | Wohrle et al. | |
| 8,286,519 B2 | 10/2012 | Duits et al. | |
| 8,485,489 B2 * | 7/2013 | Hofschulte | B60N 2/067 248/424 |
| 2002/0073790 A1 | 6/2002 | Wiesler et al. | |
| 2004/0012236 A1 | 1/2004 | Mallard | |
| 2004/0206195 A1 | 10/2004 | Landskron et al. | |
| 2004/0206878 A1 | 10/2004 | Borbe et al. | |
| 2005/0103137 A1 | 5/2005 | Chang et al. | |
| 2005/0126333 A1 | 6/2005 | Dohles et al. | |
| 2005/0269478 A1 * | 12/2005 | Woehrle | F16H 1/16 248/430 |
| 2006/0060017 A1 * | 3/2006 | Ruebusch | A01D 34/69 74/340 |
| 2006/0150758 A1 * | 7/2006 | Wohrle | B60N 2/0232 74/89.36 |
| 2006/0170266 A1 | 8/2006 | Landskron et al. | |
| 2006/0186687 A1 | 8/2006 | Kimura et al. | |
| 2006/0213302 A1 * | 9/2006 | Hoffmann | B29C 45/1671 74/425 |
| 2006/0249644 A1 | 11/2006 | Folliot et al. | |
| 2006/0278037 A1 * | 12/2006 | Borbe | B60N 2/0232 74/640 |
| 2006/0289717 A1 | 12/2006 | Ito | |
| 2007/0051047 A1 | 3/2007 | Taubmann et al. | |
| 2007/0068301 A1 * | 3/2007 | Hoch | B60N 2/067 74/425 |
| 2007/0108360 A1 | 5/2007 | Ito et al. | |
| 2007/0157752 A1 | 7/2007 | Knopfle et al. | |
| 2007/0214902 A1 | 9/2007 | Wang | |
| 2008/0078908 A1 | 4/2008 | Koga | |
| 2008/0087122 A2 | 4/2008 | Hoch et al. | |
| 2008/0105810 A1 | 5/2008 | Hofschulte et al. | |
| 2008/0197654 A1 | 8/2008 | Livesey et al. | |
| 2008/0282822 A1 * | 11/2008 | Birker | B60N 2/067 74/89.39 |
| 2009/0120219 A1 * | 5/2009 | Lykkegaard | F16H 25/2472 74/89.26 |
| 2010/0133408 A1 * | 6/2010 | Umezaki | B60N 2/067 248/429 |
| 2010/0320352 A1 * | 12/2010 | Weber | B60N 2/067 248/429 |
| 2012/0325033 A1 * | 12/2012 | Bosecker | B60N 2/067 74/89.23 |

FOREIGN PATENT DOCUMENTS

| | | |
|---|---|---|
| DE | 1 258 573 | 1/1968 |
| DE | 1 755 740 A1 | 1/1972 |
| DE | 36 40 197 A1 | 10/1987 |
| DE | 39 19 378 A1 | 12/1989 |
| DE | 298 14 447 U1 | 1/1999 |
| DE | 198 15 283 A1 | 10/1999 |
| DE | 198 31 442 A1 | 1/2000 |
| DE | 198 61 100 A1 | 2/2000 |
| DE | 199 12 978 A1 | 2/2000 |
| DE | 199 11 432 A1 | 9/2000 |
| DE | 199 42 973 A1 | 3/2001 |
| DE | 199 56 614 A1 | 5/2001 |
| DE | 199 57 440 A1 | 6/2001 |
| DE | 696 15 917 T2 | 6/2002 |
| DE | 101 39 051 A1 | 7/2002 |
| DE | 696 20 623 T2 | 12/2002 |
| DE | 101 39 631 A1 | 3/2003 |
| DE | 102 50 994 A1 | 8/2003 |
| DE | 102 30 514 A1 | 1/2004 |
| DE | 202 20 866 U1 | 7/2004 |
| DE | 103 08 028 A1 | 9/2004 |
| DE | 103 37 475 A1 | 3/2005 |
| DE | 103 53 245 A1 | 6/2005 |
| DE | 103 58 586 A1 | 7/2005 |
| DE | 103 61 874 A1 | 7/2005 |
| DE | 10 2004 054 192 B3 | 2/2006 |
| DE | 10 2005 001 333 A1 | 7/2006 |
| DE | 10 2006 011 717 A1 | 10/2006 |
| DE | 10 2006 011 718 A1 | 10/2006 |
| DE | 10 2005 044 467 B3 | 3/2007 |
| DE | 10 2006 035 437 A1 | 5/2007 |
| DE | 10 2005 060 799 B3 | 6/2007 |
| DE | 10 2005 063 402 A1 | 8/2007 |
| DE | 10 2006 022 947 B3 | 9/2007 |
| DE | 20 2006 009 868 U1 | 11/2007 |
| DE | 10 2006 031 258 A1 | 1/2008 |
| DE | 20 2006 012 434 U1 | 2/2008 |
| DE | 10 2004 013 009 B4 | 3/2008 |
| DE | 10 2006 049 807 A1 | 4/2008 |
| DE | 10 2006 049 809 A1 | 4/2008 |
| DE | 10 2006 052 936 A1 | 5/2008 |
| DE | 10 2006 058 361 A1 | 6/2008 |
| DE | 20 2007 011 851 U1 | 2/2009 |
| DE | 10 2007 059 744 A1 | 6/2009 |
| DE | 20 2009 001 847 U1 | 8/2010 |
| EP | 0 227 694 B1 | 11/1988 |
| EP | 0 311 478 A1 | 4/1989 |
| EP | 0 759 374 A2 | 2/1997 |
| EP | 0 979 750 A2 | 2/2000 |
| EP | 1 330 013 A1 | 7/2003 |
| EP | 1 442 923 A2 | 8/2004 |
| EP | 1 738 953 A2 | 1/2007 |
| EP | 1 829 735 A1 | 9/2007 |
| EP | 2 070 761 A2 | 6/2009 |
| FR | 2 721 668 A1 | 12/1995 |
| FR | 2 832 362 A1 | 5/2003 |
| FR | 2 872 747 | 1/2006 |
| JP | 08-216745 | 8/1996 |
| JP | 2004-106713 | 4/2004 |
| JP | 2007-055527 | 3/2007 |
| JP | 2007-210504 | 8/2007 |
| KR | 2002-0072621 | 9/2002 |
| KR | 10-0862286 B1 | 10/2008 |
| WO | WO 2005/015054 A1 | 2/2005 |
| WO | WO 2006/034711 A1 | 4/2006 |
| WO | WO 2008/046752 A1 | 4/2008 |
| WO | WO 2008/049200 A1 | 5/2008 |

OTHER PUBLICATIONS

Chinese Examination Report for Application No. 201080007537.0, dated Mar. 5, 2013, 9 pages and English translation, 14 pages.
International Search Report, dated Jul. 30, 2010, corresponding to PCT/EP2010/051729, 11 pages.

* cited by examiner (A-A)

(B-B)

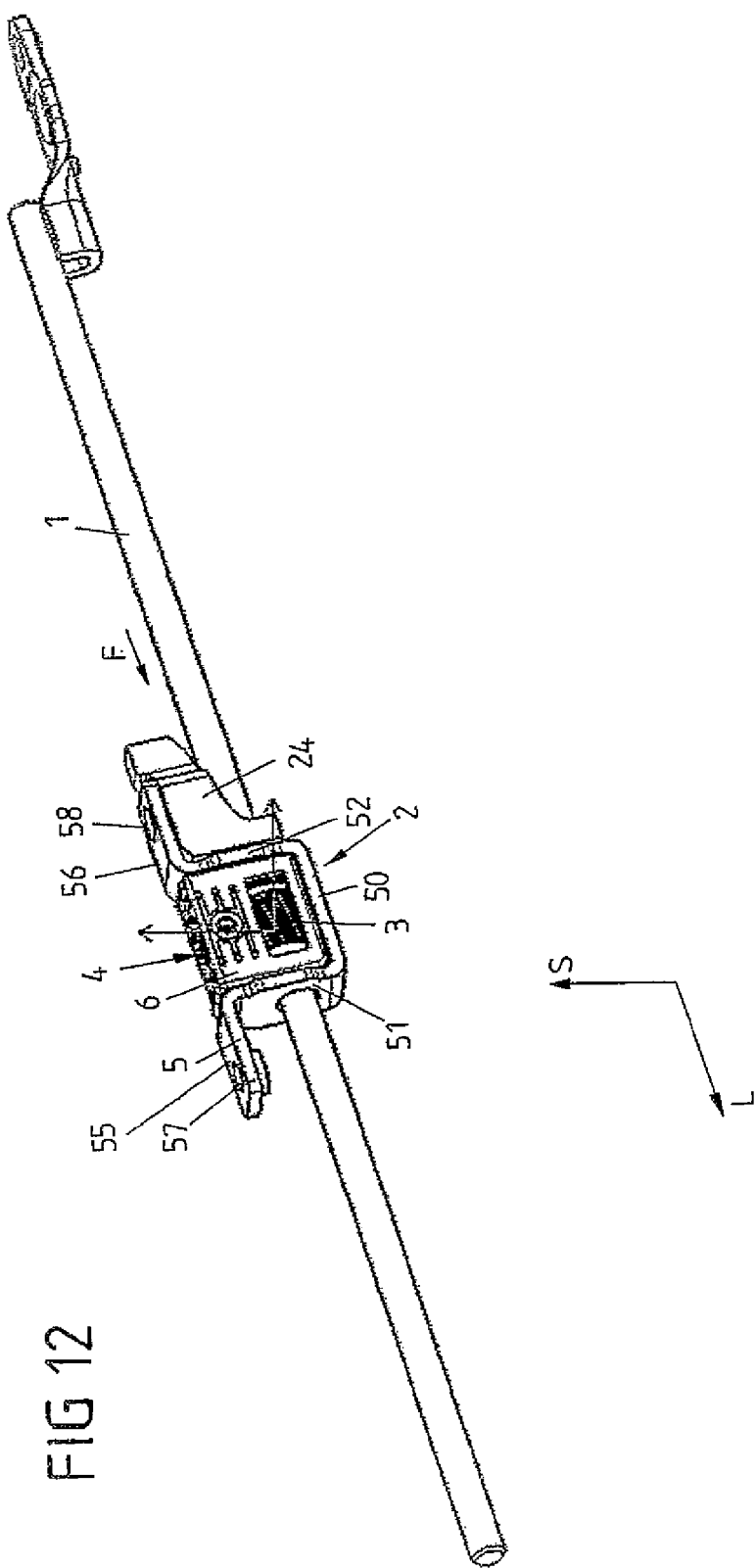

SPINDLE DRIVE FOR LONGITUDINALLY ADJUSTING A MOTOR VEHICLE SEAT

CROSS-REFERENCE TO A RELATED APPLICATION(S)

This application is a divisional application of U.S. patent application Ser. No. 13/201,203, filed Aug. 11, 2011, which is a National Phase Patent Application and claims the priority of International Patent Application Number PCT/EP2010/051729, filed on Feb. 11, 2010, which claims priority of German Patent Application Number 20 2009 001 847.4, filed on Feb. 11, 2009. The entire contents all of of which are hereby expressly incorporated by reference.

BACKGROUND

The invention relates to a spindle drive for longitudinally adjusting a motor vehicle seat.

A spindle drive illustrated in FIG. 1 is known from DE 10 2006 058 361 A1, which comprises a spindle 1, which engages with an adjusting mechanism 2, which is connected to the adjustment rail of the longitudinal seat adjustment for the vehicle seat, for instance an upper rail mounted sliding in a lower rail connected to the motor vehicle floor. A fixing bracket 5, preferably out of metal and in particular out of steel, serves for mounting the adjusting mechanism, wherein said fixing bracket comprises a base 50 and two lateral arms 51, 52, on which in each case through-openings 53, 54 for the spindle 1 are arranged. A fixing flange 55, 56 with a fixing position in form of a fixing opening 57, 58 projects in each case from the two lateral arms 51, 52 of the fixing bracket 5, between which and the base 50 the adjusting mechanism 2 is arranged, wherein via said openings the fixing bracket 5 is mounted to the adjustment rail.

The adjusting mechanism 2 comprises a transmission housing 6, in which a spindle nut 3 and a driving worm 4 are arranged and mounted. The spindle nut 3 contains an internal toothing being engaged with the external thread 10 of the spindle 1 as well as an external toothing, which meshes with the driving worm 4. When operating the spindle drive, the spindle nut 3 is set into a rotational movement via the driving worm 4 being connected to a driving device, wherein said rotational movement is being transferred due to the engagement of the internal toothing of the spindle nut 3 into the external toothing 10 of the spindle 1 into a longitudinal movement of the adjusting mechanism 2 relative to the spindle 1 so that the adjusting mechanism 2 is adjusted relative to the spindle 1 being connected to the vehicle stationary and torque-proofed, and adjusts the adjustment rail of the longitudinal adjustment of the motor vehicle seat connected to the adjusting mechanism 2 and thus adjusts the motor vehicle seat in longitudinal direction of the spindle 1 relative to the motor vehicle floor.

In order to guarantee a secure and tight fixture of the upper rail, the adjusting mechanism 2 is dimensioned such that it can capture and support the forces introduced from the adjustment rail during a normal adjusting movement of the motor vehicle seat. In case of an impact, in particular during a frontal or rear end impact of the motor vehicle, it has however to be ensured that the adjusting mechanism 2 does not slides through in longitudinal direction of the spindle 1, since this would lead to an undesired acceleration of the motor vehicle seat connected to the adjustment rail of the longitudinal seat adjustment and thus to an increased risk of injury for a motor vehicle occupant residing on the motor vehicle seat.

In order to allow for a simple, easy and cost-efficient construction of the adjusting mechanism 2, the transmission housing 6 and the spindle nut 3 are preferably formed of plastic, wherein the spindle nut made of plastic also contributes with its plastic toothings to a minimization of noise during an adjusting movement.

For increasing the strength and stability of the adjusting mechanism 2, the adjusting mechanism 2 is encompassed by the fixing bracket 5 made of metal and is connected via the fixing bracket 5 to the adjustment rail of the longitudinal feet adjustment, so that in case of an impact the fixing bracket 5 is deformed by the spindle nut 3 and the transmission housing 6, until depending on the occurrence of a frontal or rear end impact the respective through-opening 53, 54 of the fixing bracket 5 grips into the thread of the external thread 10 of the spindle 1 and through this secures the motor vehicle seat connected to the adjusting mechanism 2 via the adjustment rail of the longitudinal seat adjustment in case of an impact against an undesired longitudinal adjustment.

Since the requirements to the impact stability of the spindle drive also relate to extreme climate conditions with temperatures in a range of −30° C. to +80° C., which could lead to an increased flow or embrittlement of the plastic in case of a spindle nut 3 consisting of plastics due to weight and production reasons, the danger exist that the forces acting in case of an impact are not longer sufficiently transferred from the spindle nut 3 via the transmission housing 6 to the fixing bracket 5 in order to deform said bracket for gripping in the spindle 1 so that the danger of a non-locking of a longitudinal seat adjustment of a motor vehicle seat in case of an impact exist at least at extreme temperatures.

SUMMARY

The object of the present invention is therefore to provide a spindle drive of the previous mentioned kind, wherein the stability and impact strength thereof are guaranteed also at extreme temperatures by maintaining a simple, light and due to the plastic toothing noise-optimised and cost-efficient construction of the adjusting mechanism.

The solution according to the invention guarantees a high stability and impact strength of the spindle drive for longitudinal seat adjustment also at extreme temperatures combined with an easy, light, noise-optimised and cost-efficient construction of the adjusting mechanism.

The division of a hybrid-spindle nut in a functional part and a strengthening part allows for optimising both parts of the hybrid-spindle nut in respect to its intended function regarding the type of construction as well as regarding the material selection and to supply there through the advantage of a simple, light and cost-efficient construction with a stability and in particular an impact strength of the spindle drive sufficient within a very large temperature range.

Accordingly, the functional part and the at least one strengthening part of the hybrid-spindle nut consists according to a feature of the invention of different materials adapted to the respective strength requirements or comprise different material fractions adapted to the respective strengthening requirements, wherein in particular the functional part is arranged in a centre area of the hybrid-spindle nut and contains the external and internal toothing of the hybrid-spindle nut in the power flux between the driving worm and the spindle and that the at least one strengthening part forms a front face of the hybrid-spindle nut and for instance consists of at least one bush forming the front face of the hybrid-spindle nut.

The hybrid-spindle nut consisting of a functional part and at least one strengthening part made of different materials is thus produced in the centre functional part completely or at least in the toothing area of the external and internal toothing made of plastic, while the axial outer areas of the hybrid-spindle nut forming the strengthening part are provided with bushes, which have a higher strength due to an appropriate material selection or material composition in the functional part of the hybrid-spindle nut, so that the transfer of impact forces to the transmission housing or the fixing bracket is guaranteed so that these ones can grip into the external toothing of the spindle in case of an impact.

If only a one-sided impact strength is also required at extreme temperature, then the strengthening part of the hybrid-spindle nut can be provided only on one side assigned to the respective impact in the axial outer area of the hybrid-spindle nut, while the area on the other side of the hybrid-spindle nut is made of a material with lower strength or made of a material of the functional part of the hybrid-spindle nut.

In an exemplary embodiment, the at least one strengthening part, for instance a bush of a hybrid-spindle nut comprises an internal toothing, the tooth flanks thereof being separated from the tooth flanks of the external thread of the spindle such that under normal operation only the internal toothing of the functional part engages with the external thread of the spindle.

The bush of the hybrid-spindle nut forming the strengthening part replaces the function of an additional thrust washer on the front face end of the hybrid-spindle nut, while the formation of a large tooth backlash between the internal toothing of the bush and the external thread of the spindle ensures that the internal toothing of the bush does not engage during normal operation with the external thread of the spindle, and thus "runs dry". Only in case of an impact, if the tooth flanks of the internal toothing made of plastic of the functional part of the hybrid-spindle nut deform, the internal toothing of the strengthening part or the bush engages with the external thread of the spindle and ensures therewith that the impact force is diverted from the adjustment rail of the longitudinal seat adjustment of the motor vehicle seat via the transmission housing or the fixing bracket and via the bush made of metal forming the strengthening part of the hybrid-spindle nut into the stationary spindle.

Alternatively, the at least one strengthening part is axial spaced from bearing blocks of a transmission housing of the adjusting mechanism and/or from lateral arms of the fixing bracket as well as from an axial front face of the functional part and comprises an internal toothing, which meshes with the external thread of the spindle.

In this alternative embodiment, the internal toothing of the at least one strengthening part meshes indeed with the external thread of the spindle, due to the axial distance of the front faces of the functional part opposing each other and the at least one strengthening part, however, no axial loading of the strengthening part occurs, that means under normal operation no axial force is introduced into the strengthening part so that the strengthening part effects no additional frictional resistance in adjustment direction, which could decrease the efficiency or the force to be transferred. If in case of an impact the tooth flanks of the internal toothing of the functional part of the hybrid-spindle nut consisting preferably of plastic deform, the impact force is diverted from the adjustment rail of the longitudinal feed adjustment of the motor vehicle seat via the transmission housing of the adjusting mechanism or the fixing bracket into the at least one strengthening part made of high strength material and from said part via the internal toothing of the strengthening part engaging with the external thread of the spindle into the stationary spindle.

In order to ensure that under normal operation the at least one strengthening part does not block the adjustment movement of the hybrid-spindle nut the functional part comprises in the two previously mentioned embodiments at the front face facing the strengthening part at least one carrier acting in circumferential direction, which corresponds to a carrier arranged on the front face of the strengthening part facing the functional part such that in case of a rotational movement of the functional part introduced via the driving worm, the strengthening part is carried along in the respective rotational direction.

Through this it is ensured that in the first embodiment the internal toothing of the strengthening part, which does not engage with the external thread of the spindle, idles without force transfer and in the second embodiment that the internal toothing of the strengthening part meshing with the external thread of the spindle transfer does not transfer axial forces and thus no frictional resistance occurs between the strengthening part and the spindle, which would lead to a decrease of the efficiency and effectiveness of the adjustment force.

Multiple projections and slots formed on the circumference of the front faces of the strengthening parts and functional part opposing each other of the type of the toothing and engaging with each other are provided as carrier, which are preferably formed according to the kind of dove-tail guides.

The design of the carrier as multiple projections and slots preferably evenly formed on the circumference of the front faces of the strengthening part and functional part opposing each other in the kind of the toothing and engaging with each other guarantees an even and on the circumference evenly distributed carrier force so that no tilting or jamming of the at least one strengthening part can occur. The design of the projections and slots in the kind of a dove-tail guidance with wedge-like projections and accordingly wedge-like slots allow a simple assembly and in particular in case of the arrangement of the strengthening part with axial distance in respect to the front face of the functional part or the transmission housing or the fixing brackets allows the possibility of sticking together the strengthening and functional part before inserting the spindle into the thread holes of the strengthening part and the functional part being aligned to each other.

The functional part of a hybrid-spindle nut consists preferably of a hollow cylindrical base body with a cylindrical shaped deepening arranged on at least one front face, in which a cylindrical shaped projection of the bush of the hybrid-spindle nut formed as the strengthening part engages, wherein a flange resting against the front face of the hollow cylindrical base body of the functional part is adjacent to the cylinder-shaped projection of the bush, a cylindrical shaped offset is adjacent to the flange and a front face of the functional part formed as a hollow cylindrical base body comprises a radial flange being flush to the top circle of the external toothing of the functional part.

Die division of the hybrid-spindle nut according to the invention in a functional part and a strengthening part can be realised in different manner In a first exemplary embodiment the at least one bush formed as a strengthening part is connected to the hollow cylindrical base body of the functional part by gluing or laser welding, wherein the strengthening part of the hybrid-spindle nut contains a hard metallic material, in particular steel, or consists of a hard metallic material and a functional part consists at least in the engagement area of the internal and external toothing of plastic or the strengthening part is formed as an insert part from a hard metallic body overmoulded with plastic and the functional part consists of a metallic material overmoulded with plastic or of plastic.

Alternatively, the strengthening part can consist of a plastic with high strength and the functional part can consist of a plastic with low strength.

In a second exemplary embodiment the functional part consists of plastic, which is overmoulded to the at least one bush formed as a strengthening part.

In a third exemplary embodiment the base body of the hybrid-spindle nut consists of a hollow cylindrical body of a metallic material, in particular of steel, with slim tooth flanks as internal thread, which is overmoulded internally and at least in the area of the external thread of the functional part with plastic.

In a fourth exemplary embodiment the base body of a hybrid-spindle nut consists of two hollow cylindrical half shells of metal, which are enclosed in the area of the front faces by two sleeves serving as strengthening part, while a plastic forming the internal and external toothing of the hybrid-spindle nut is overmoulded on the internal and external face of the cylindrical half shells.

In an exemplary embodiment the spindle nut is formed in at least a centre section of the functional part cylindrical with an outer cylindrical mantle face and two front faces delimiting lateral the cylindrical mantle face, and the external toothing of the spindle nut is formed by deepenings pointing radially inwards in the outer cylindrical surface of the spindle nut. It is thereby provided that the external toothing extends from the one first front face along the cylindrical mantle surface in direction to the other, second front face with a tooth depth, which decreases towards the second front face.

Since the external tooting extends from the one, first front face (that means, begins directly on the first front face) a spindle nut is provided, wherein the external toothing thereof is lateral open on the first front face. With other words, the external toothing is not delimit on the first front face in longitudinal direction so that an injection moulding tool for deforming the spindle nut in longitudinal direction can be removed from the spindle nut.

The background hereby is that when producing the spindle nut from plastics, the spindle nut is injection-moulded in an injection mould and has to be subsequently removed from the injection mould. This process is called "deforming". Since the external toothing is open in longitudinal direction on the first front face and is not laterally delimited, and additionally the tooth depth of the external toothing decreases in direction to the second front face continuously or sectionally (that means stepwise in discrete steps), the spindle nut can be pulled out of the injection moulding device in a simple manner in longitudinal direction for deforming, wherein for injection moulding of the external toothing no feeder is required and the injection moulding can be obtained in one working step in a injection mould without feeder. This simplifies the production process tremendously in respect to conventional spindle nuts, in case of which an external toothing has to be formed by deepenings pointing radially inwards by radial insertion of feeders.

The external toothing of the spindle nut can comprise in longitudinal direction at least two different toothing sections, of which one first toothing section comprises a cylindrical toothing with a constant tooth depth and a second toothing section comprises a non-cylindrical toothing with a tooth depth decreasing in direction to the second front face. The tooth depth is thereby measured as a radial distance between the tooth space and the cylindrical mantle surface wrapping the toothing in radial direction.

In the first toothing section with cylindrical toothing the external toothing can for instance comprise an involute profile with straight tooth base and constant tooth depth. In the second toothing section, the tooth depth changes and decreases towards the second front face, wherein the tooth base can be for instance curved and increases in radial direction.

The tooth base can hereby comprise for instance a radius, which is smaller or equal to the maximum tooth depth of the external toothing.

It is also conceivable and of an advantage to form the external toothing in the second toothing section as globoid toothing with teeth, which are adapted to the external toothing of the driving worm and the tooth depth thereof decreases in direction to the second front face. The tooth base of the globoid toothing comprises in this case a radius, which is larger than the maximum tooth depth.

In each case, the tooth depth decreases towards the second front face of the centre section of the spindle nut so that on or already before the second front face the tooth depth is reduced to zero.

When using a globoid toothing in sections of the external tooting an external toothing is provided, which can also transfer large adjustment forces with sufficient strength said forces being introduced via the driving worm. The globoid toothing is thereby adapted to the toothing of the driving worm for a beneficial force transfer such that the forming of the singular teeth with its tooth base and its tooth flanks is adapted to the toothing of the driving worm for a flat contact.

The tooth depth of the external toothing decreases towards the second front face, wherein the tooth depth can already be reduced to zero before reaching the second front face so that an end section without external toothing is provided on the second front face. This cylindrical end section on the mantle surface of the spindle nut can for instance serve as mounting section for the spindle nut.

The external toothing is in contrast not delimit by an end section on the first front face so that the external toothing is lateral open at the first front face and, as previously explained, the spindle nut can be produced in a simple manner by injection moulding without using additional feeders in the injection moulding tool.

It is basically possible to form the external toothing of the spindle nut as a spur toothing or as helical toothing. When using a spur toothing, the teeth of the external toothing are directed along the longitudinal direction and thus along the spindle. When formed as helical toothing, the teeth are directed angular to the longitudinal direction.

The spindle nut engages with the driving worm via the external toothing and is set into a rotational movement for operating the adjusting mechanism. The rotational movement of the spindle nut is thereby turned by engagement of its internal toothing with an external thread of the spindle into a longitudinal movement of the adjusting mechanism along the spindle. In a preferred embodiment, the spindle nut can be thereby formed such that the internal toothing is shifted along the longitudinal direction to the external toothing so that a central plane of the external toothing continuing vertical to the longitudinal direction is spaced axially to a central plane of an internal toothing. This provides a spindle nut being asymmetrically in longitudinal direction within an asymmetrical powerflux, in which the centre of gravity of the external toothing is spaced apart from the centre of gravity of the internal toothing along the longitudinal direction.

The internal toothing of the spindle nut can hereby comprise in a preferred manner in longitudinal direction a larger length than the external toothing of the spindle nut, for instance by extending the internal toothing axial beyond the external toothing of the spindle nut into a bearing collar of the spindle nut arranged on the first front face. The bearing collar serves thereby the mounting of the spindle nut on a transmission housing of the adjusting mechanism.

In a further exemplary embodiment of the spindle mechanism a strengthening part can additionally be provided, which supports the adjusting mechanism in respect to the adjustment rail, on which the adjusting mechanism is arranged, in the longitudinal direction of the spindle such that due to the strengthening part the adjusting mechanism is in case of forces being introduced in the longitudinal direction from the adjustment rail into the adjusting mechanism of a higher stiffness in respect to the adjustment rail compared to forces introduced against the longitudinal direction.

It can be for instance provided that the strengthening part supports the adjusting mechanism on one side, by supporting the adjusting mechanism in respect to the forces acting in the longitudinal direction and being introduced from the adjustment rail into the adjusting mechanism, but not by supporting said mechanism in respect to forces acting against the longitudinal direction. The strengthening part can be arranged for this reason in longitudinal direction of the spindle behind the adjusting mechanism (wherein the longitudinal direction of the spindle corresponds to a vehicle longitudinal direction directed in direction of the forward operation of a vehicle) in order to support the forces introduced into the adjusting mechanism in a frontal impact due to the inertia of the vehicle seat and a vehicle occupant.

The idea hereby is to provide a strengthening part that supports the adjusting mechanism on one side and acts between the adjusting mechanism and the adjustment rail, on which the adjusting mechanism is arranged. The strengthening part is formed to absorb and support forces in the longitudinal direction of the spindle such that when a force acts in the longitudinal direction of the spindle, the adjusting mechanism is supported stiffly in contrast to the assigned adjustment rail. The strengthening part can thereby be formed such that it is being loaded when a force acts in the longitudinal direction and guarantees a stiff connection of the adjusting mechanism, however, is not being loaded when the force acts in the opposite direction against the longitudinal direction and the connection of the adjusting mechanism to the assigned adjustment rail does not stiffen. In this manner it can be achieved that for instance during a frontal impact the adjusting mechanism is stiffly tight to the adjustment rail and cannot be deformed, in contrast during a rear end impact, that means in case of a force acting in a opposite direction, the connection of the adjusting mechanism to the assigned adjustment rail comprises a lesser stiffness and a deformation of the adjusting mechanism and/or its connection is being allowed, which provides a predetermined maximum displacement between the vehicle parts connected via the adjusting mechanism and the spindle. In this manner, a vehicle seat can be kept during a frontal impact with high stiffness, while during a rear end impact a certain displacement of the vehicle seat is possible by deforming within the meaning of the crash zone, which reduces the forces transferred to a vehicle occupant during a rear end impact and dampens a rear displacement, which could lead to whiplash.

Requirement for the application of such a strengthening part is a sufficiently crash solid spindle nut for instance in form of a hybrid-spindle nut, which can absorb large loading forces. This is because during a frontal impact the adjusting mechanism is supported in a stiff manner by the effect of the strengthening part so that a fixing bracket holding the adjusting mechanism cannot be deformed and can grip the spindle for supporting the impact forces. The forces acting during a frontal impact have therefore to be hold by the (hybrid) spindle nut in order to avoid a slipping through of the spindle nut due to destruction of the internal toothing.

If an adjusting mechanism with a hybrid-spindle nut is used in combination with a strengthening part, the strengthening part of a hybrid-spindle nut is arranged on the side of the hybrid-spindle nut facing the strengthening part.

If not only a one-sided support is desired, then of course a further strengthening part of the same kind can be provided, which is arranged in longitudinal direction before the adjusting mechanism for receiving the forces introduced during a rear end impact, so that also during a rear end impact a stiff connection of the adjusting mechanism to the assigned adjustment rail is guaranteed.

In order to support the forces introduced in the longitudinal direction of the spindle, the strengthening part can for instance comprise supporting rips. These supporting rips can, if the strengthening part comprises in cross section cross-wise to the longitudinal direction of the spindle a U-shape, be formed by the arms of the U-shape. If the adjusting mechanism projects in a vertical direction cross-wise to the longitudinal direction of the spindle from the adjustment rail, then the supporting rips extend preferably in parallel planes spanned by the vertical direction and the longitudinal direction so that forces directed in the longitudinal direction act in the plane of the supporting rips and thus can be advantageously supported by the supporting rips. In order to support forces introduced in the longitudinal direction, the supporting rips are thereby arranged in longitudinal direction behind the adjusting mechanism and provide in case of such acting forces a stiff connection of the adjusting mechanism.

In another exemplary embodiment the strengthening part can also be formed as a square-cut block arranged on the adjustment rail, wherein said block is formed for the essentially deformation-free absorption of forces introduced in the longitudinal direction of the spindle. The block is thereby also arranged in longitudinal direction behind the adjusting mechanism and supports the forces acting in the longitudinal direction so that in case of forces introduced in the longitudinal direction, for instance during a frontal impact, a stiff connection of the adjusting mechanism to for instance the adjustment rail is guaranteed.

By providing the strengthening part it is achieved that the adjusting mechanism and its connection to the adjustment rail are supported on one side. When including the strengthening part the connection can thereby be assessed and dimensioned such that in case of forces introduced in the longitudinal direction from the adjustment rail into the adjusting mechanism due to the supporting action of the strengthening a displacement between the adjustment rail and a body mounted rail, on which the spindle is arranged, can occur of less than 10 mm, preferably less than 5 mm and in case of forces introduced against the longitudinal direction from the adjustment rail into the adjusting mechanism a displacement between the adjustment rail and the body mounted rail can occur between 20 and 40 mm, preferably about 30 mm. By providing the strengthening part in essentially stiff and form-stable connection with a minimal displacement is provided during the action of a force in longitudinal direction, while in case of opposite acting force a deformation within the meaning of a crash zone is possible with a noticeable displacement. In this manner, for instance during a frontal impact, a deformation can be excluded as far as possible so that no displacement occurs, while during a rear end impact the adjustment rail and the body mounted rail are displaced towards each other about a distance by deformation of the connection in order to dampen in this manner the forces acting on a vehicle occupant.

BRIEF DESCRIPTION OF THE DRAWINGS

The essential features of the invention and its different realisation shall be explained by means of the embodiments illustrated in the drawings in more detail.

FIG. 12 shows a view of a spindle mechanism with a strengthening part for a one-side support of an adjusting mechanism.

DETAILED DESCRIPTION

Figure 1:
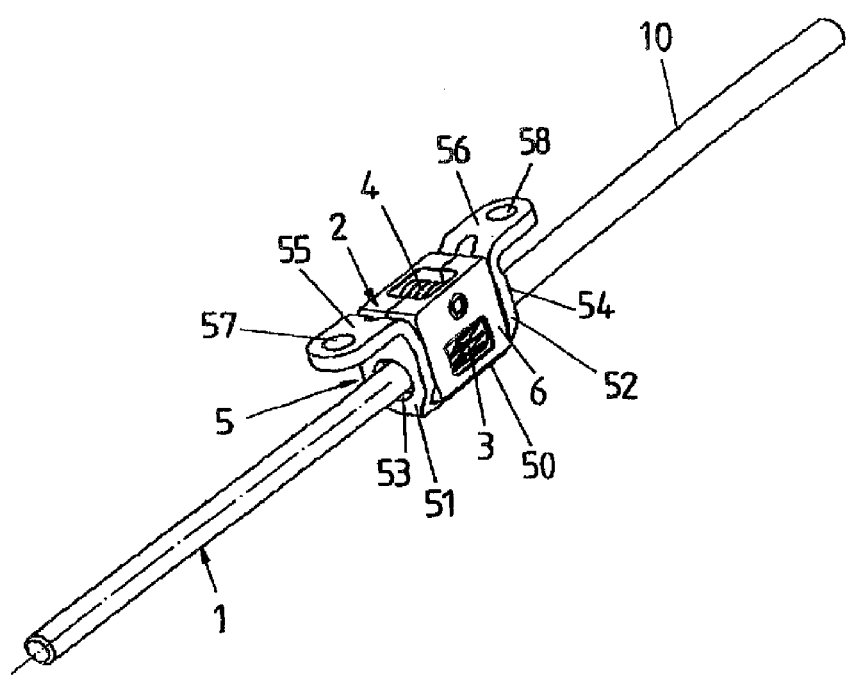
FIG. 1 shows a perspective illustration of the spindle mechanism with a spindle, an adjusting mechanism and a fixing bracket.
Figure 2:
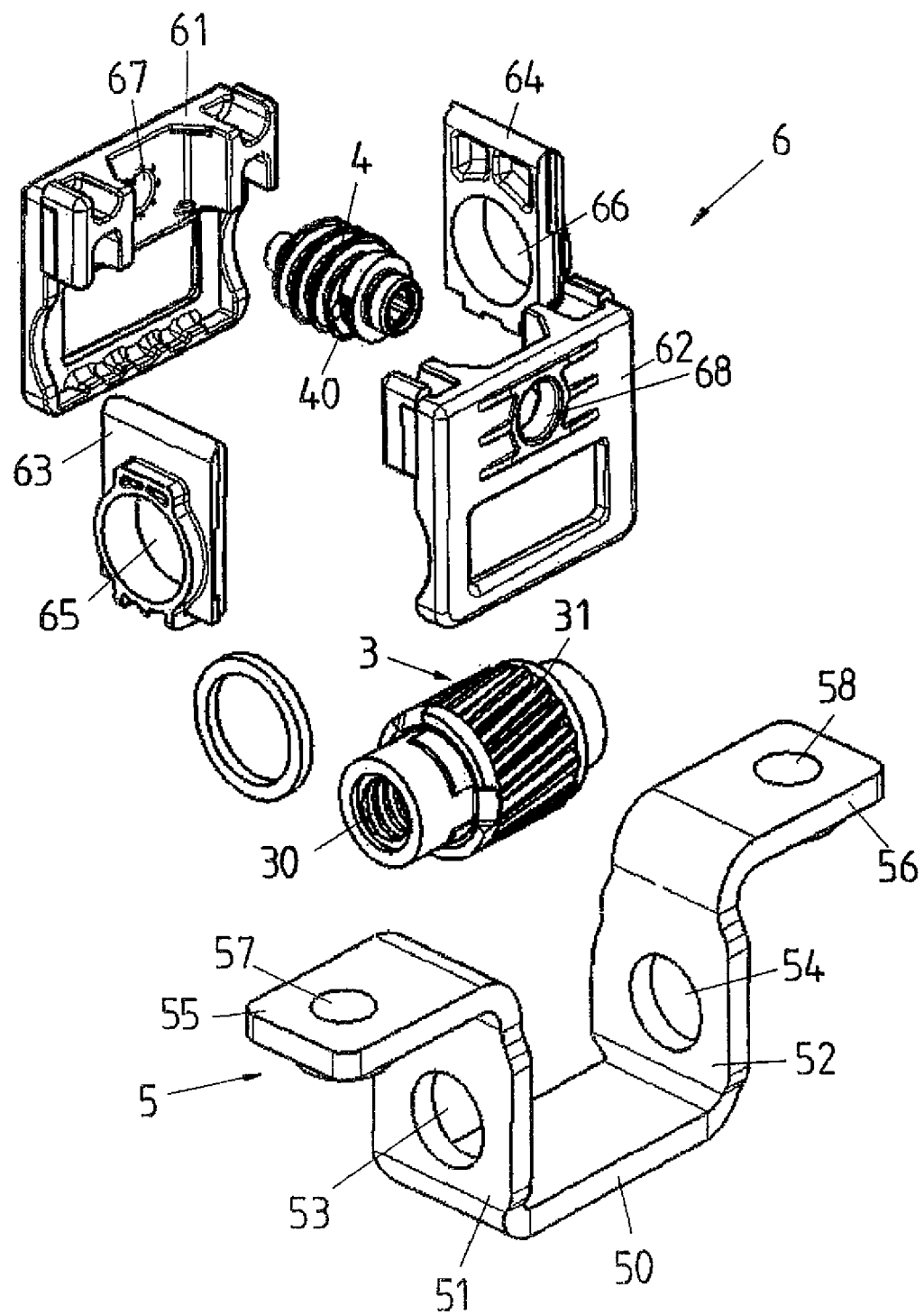
FIG. 2 shows an illustration of singular components of the adjusting mechanism according to FIG. 1.

FIG. 2 shows a perspective illustration the singular elements of the adjusting mechanism 2 according to FIG. 1, wherein the same reference signs indicate same parts as in FIG. 1 so that in respect to the composition and function of the adjusting mechanism 2 it is being pointed to the previous description of FIG. 1.

The transmission housing 6 of the adjusting mechanism according to FIG. 1 consists of two housing shells 61, 62 with bore holes 67, 68 arranged therein for receiving the driving worm 4 as well as two bearing blocks 63, 64 with bearing bores 65, 66 arranged therein for receiving the hybrid spindle nut 3, the external toothing 31 thereof formed as a helical toothing meshes with the worm toothing 40 of the driving worm 4 and the internal toothing thereof, being not recognisable in FIG. 2, engages in the assembled state of the spindle drive according to FIG. 1 with the external thread 10 of the spindle 1.

FIG. 2 shows furthermore the fixing bracket 5 receiving the transmission housing 6 of the adjusting mechanism, the construction and function thereof was described previously by means of FIG. 1.

Figure 3:
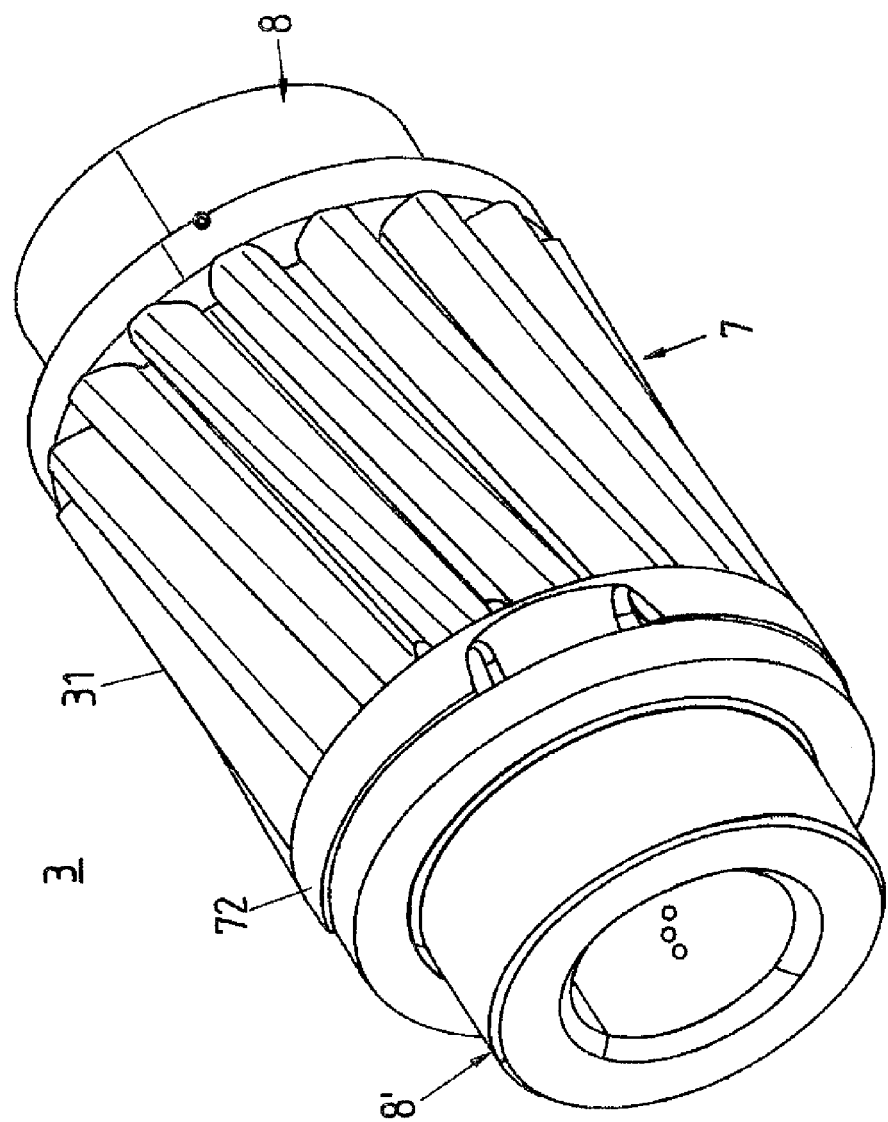
FIG. 3 shows an enlarged perspective illustration of a hybrid-spindle nut with a functional part arranged in the axial centred area and metallic bushes or metallic nuts arranged on the front faces thereof as strengthening part of the hybrid-spindle nut.

The hybrid spindle nut 3 shown in FIG. 3 in an enlarged perspective singular illustration consists of a central functional part 7 and two strengthening parts 8, 8' being arranged on the front faces of the central functional part 7. The functional part 7 includes the internal toothing meshing with the external thread 10 of the spindle 1 according to FIG. 1 as well as the external toothing 31 being formed as a helical toothing, which meshes with the worm toothing 40 of the driving worm 4. A front face of the functional part 7 is preferably closed with a flange 72. For reasons of simplified production, lower costs, minimal noises and minimal weight, the functional part 7 consists of plastics or of a material overmoulded with plastic in the area of the toothing, wherein the plastic suffices the stability requirements under normal operations, that means during adjustment of the adjustment rail of the longitudinal seat adjustment of the motor vehicle seat.

The bushes 8, 8' serving as strengthening part of the hybrid spindle nut 3 and being adjacent to the front faces of the functional part 7 consists preferably of steel, can however also consists of a plastic with high strength, a plastic coated metal or such. A bush arranged on a front face of the functional part 7 or a nut provided with an internal thread can be provided as strengthening part of a hybrid spindle nut 3 or bushes or nuts provided with an internal thread are used as strengthening parts 8, 8' on both front face ends of the functional part 7.

Figure 4:
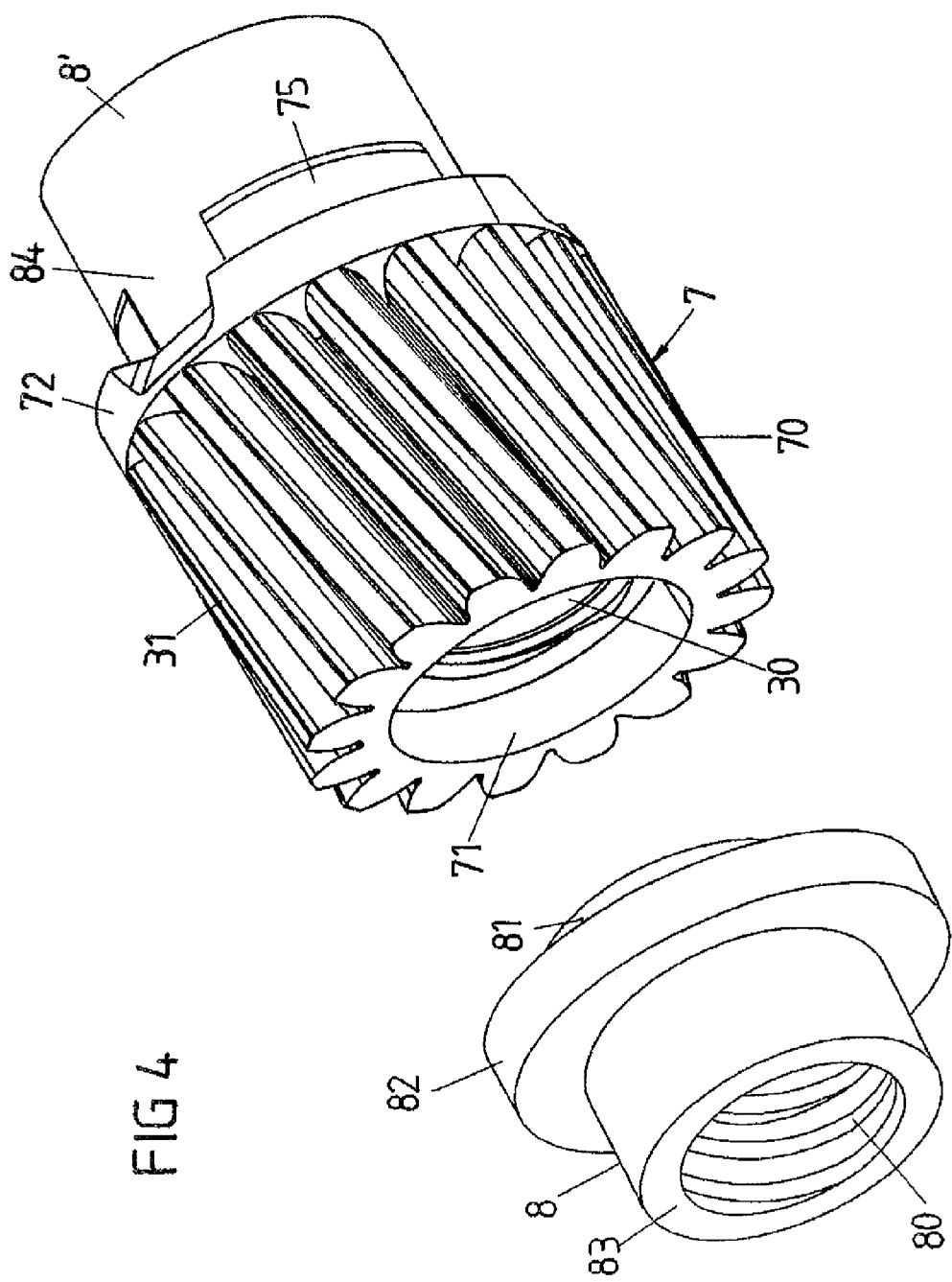
FIG. 4 shows a perspective illustration of the spindle nut illustrated in FIG. 3 before the assembly of a strengthening part formed as metal nut.

As deducible from the perspective illustrations of FIGS. 2 and 4, the functional part 7 of the hybrid spindle nut 3 comprises a hollow cylindrical base body 70, which carries the external toothing 31 of the hybrid spindle nut 3 and contains the internal toothing 30, which meshes with the external thread 10 of the spindle 1. On the front faces of the functional part 7, there are cylindering-shaped or cup-shaped deepenings 71 provided, with which the cylindering-shaped projections 81 of the bushes forming the strengthening part of the hybrid spindle nut 3 or nuts 8, 8' engage and are connected by gluing, overmoulding or lasering to the functional part 7.

As indicated in FIG. 4, if an impact stability is required only on one side, a singular strengthening part 8 of the hybrid spindle nut 3 designed as bush or nut (bush with internal thread) made of steel can be provided, that is connected to the one front face of the functional part 7 of the hybrid spindle nut 3 carrying the toothings 30, 31, while the other front face is designed with reduced stability and is for instance connected to the functional part 7 in one piece or as an overmoulded part. Alternatively, both front faces of the functional part 7 can be connected to a preferably similar strengthening part 8, 8' designed as bush or nut in order to guarantee high impact stability during a frontal as well as a rear end impact also at extreme temperatures.

A flange 82 resting against the front face of the functional part 7 is adjacent to the cylindering-shaped projection 81 of the bush or nut 8, to which a cylindering-shaped offset 83 is adjacent, which is inserted into the bearing bore 65 of the bearing block 63 of a transmission housing 6. Additionally, the bush or nut 8 is provided with an internal toothing 80, the form and function thereof is being explained in the following by means of the longitudinal section through a part of a hybrid spindle nut 3 illustrated in FIG. 5.

Figure 5:
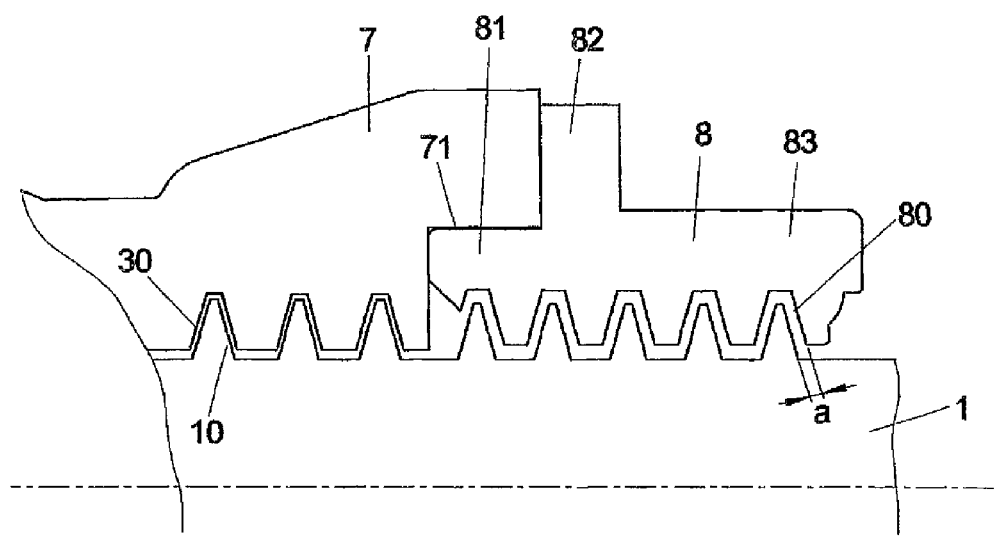
FIG. 5 shows a partial longitudinal section through the hybrid spindle nut according to FIG. 3.

The partial longitudinal section through a hybrid spindle nut 3 illustrated in FIG. 5 shows the spindle 1 with its external toothing 10 as well as the functional part 7 of the hybrid spindle nut 3 with its internal toothing 30, which is engaged with the external thread 10 of the spindle 1. The bush or nut 8 engaging with the cylindering-shaped projection 81 into the cup-shaped or cylindering-shaped deepening 71 of the functional part 7 and forming the strengthening part of the hybrid spindle nut 3 rests against the front face of the functional part 7 with the flange 82 and comprises an internal toothing 80, the tooth-shape and tooth-size thereof being formed such that it contains a distance a to the external thread 10 of the spindle 1.

The configuration illustrated in FIG. 5 shows the hybrid spindle nut 3 under normal operation of the spindle drive. In case of an impact, the internal toothing 30 of the functional part 7 of the hybrid spindle nut 3 deforms due to the material properties of the functional part 7 so that the flanks of the internal toothing 80 of the strengthening part 8 of the hybrid spindle nut 3 engages with the external thread 10 of the spindle 1 and through this the strengthening part 8 and thus the hybrid spindle nut 3 grips into the external thread 10 of the spindle 1, wherein the material properties of the strengthening part 8 guarantee that no or no essential deformation of the internal toothing 80 of the strengthening part 8 occurs and is thus ensured that the hybrid spindle nut 3 does not "slides through" in longitudinal direction of the spindle 1. Therefore, it is also ensured that the adjusting mechanism 2 being connected to the adjustment rail of the longitudinal seat adjustment of the motor vehicle seat according to FIG. 1 is not adjusted unintentionally on the spindle 1 in longitudinal direction of spindle 1.

Beside a first modification of the functional part 7 and the strengthening part 8, 8' of the hybrid spindle nut 3 with a functional part 7 made of plastic and two axial strengthening parts 8, 8' made of steel also other material compositions of the functional part 7 and the strengthening parts 8, 8' are possible, which serve the object to design the hybrid spindle nut 3 simple, light and cost-efficient with low-noise operation and high stability and impact strength also at extreme temperatures. The functional part 7 and the strengthening part 8, 8' can be for instance
- made of plastics of different high strength,
- consists of a base body of metal, preferably steel, which is overmoulded in the toothing area of the functional part with plastic,
- consists of a base body designed as a hollow cylindrical body of a metallic material with small tooth flanks as internal thread, which is overmoulded internally and at least in the area of the external thread of the functional part with plastic, or
- consists of a base body of two hollow cylindrical half shelves of metal, in particular of steel, which are enclosed in the area of the front face by two sleeves serving as strengthening part, while a plastic forming the internal and external toothing of a hybrid spindle nut is overmoulded on the internal and external surfaces of the hollow cylindrical half shelves.

The strengthening parts can consist furthermore of metal nuts, of which the one metal nut forms the actual strengthening part, while the other metal nut is provided as an additional strengthening part for receiving impact forces acting for instance during a rear end impact. Both metal nuts comprise an internal toothing, the tooth flanks thereof continue spaced apart under normal operation with a distance a according to FIG. 5 from the outer area of the spindle.

Figure 6:
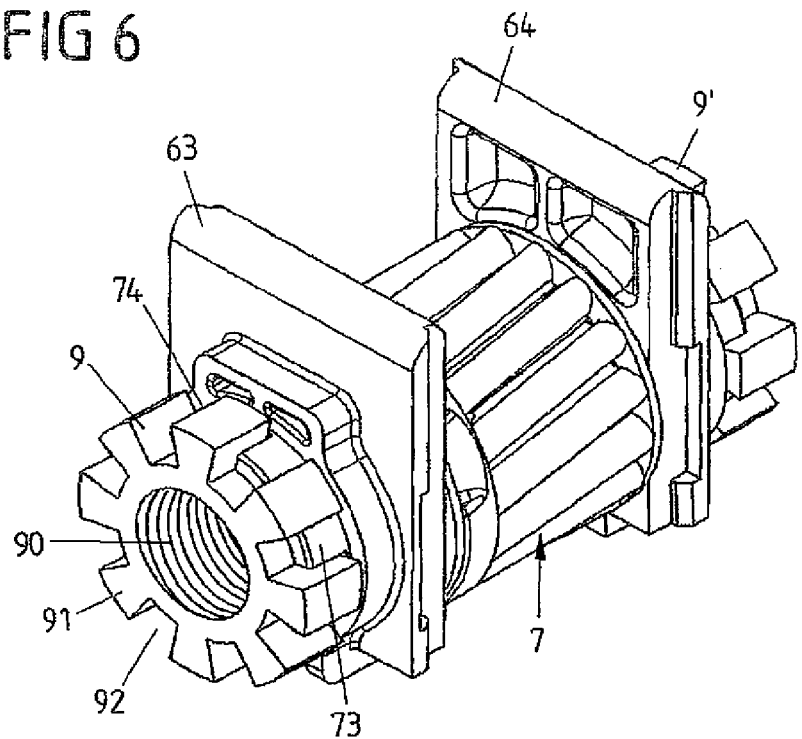
FIG. 6 shows a perspective illustration of a hybrid spindle nut with a centred functional part and two strengthening part being axially adjacent to the functional part, the front faces thereof being separated axial from the front faces of the functional part and the bearing blocks of the transmission housing of the adjusting mechanism.
Figure 7:
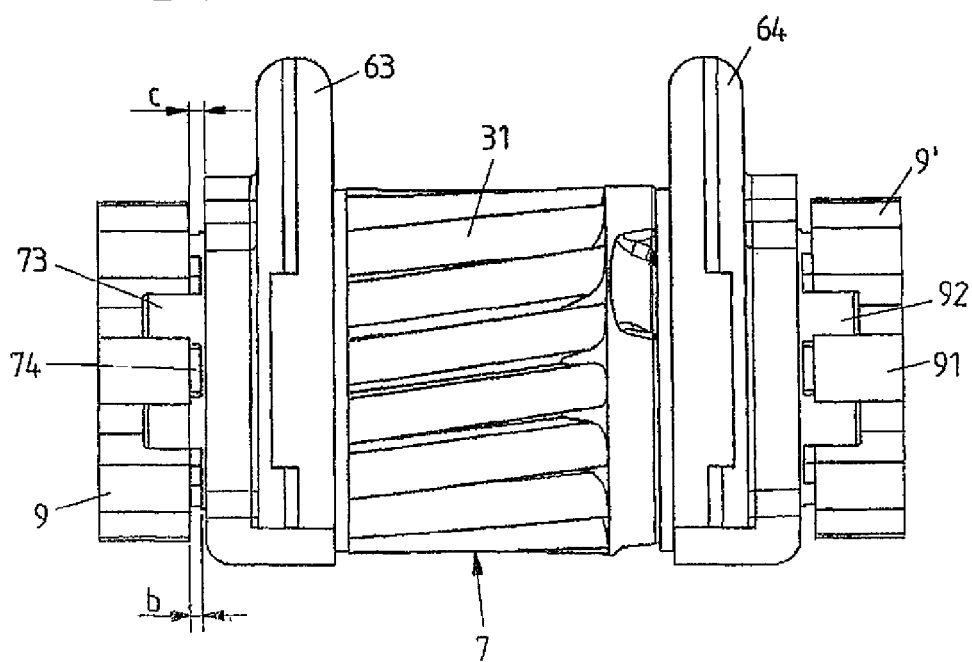
FIG. 7 shows a lateral view of the hybrid spindle nut according to FIG. 6.
Figure 8:
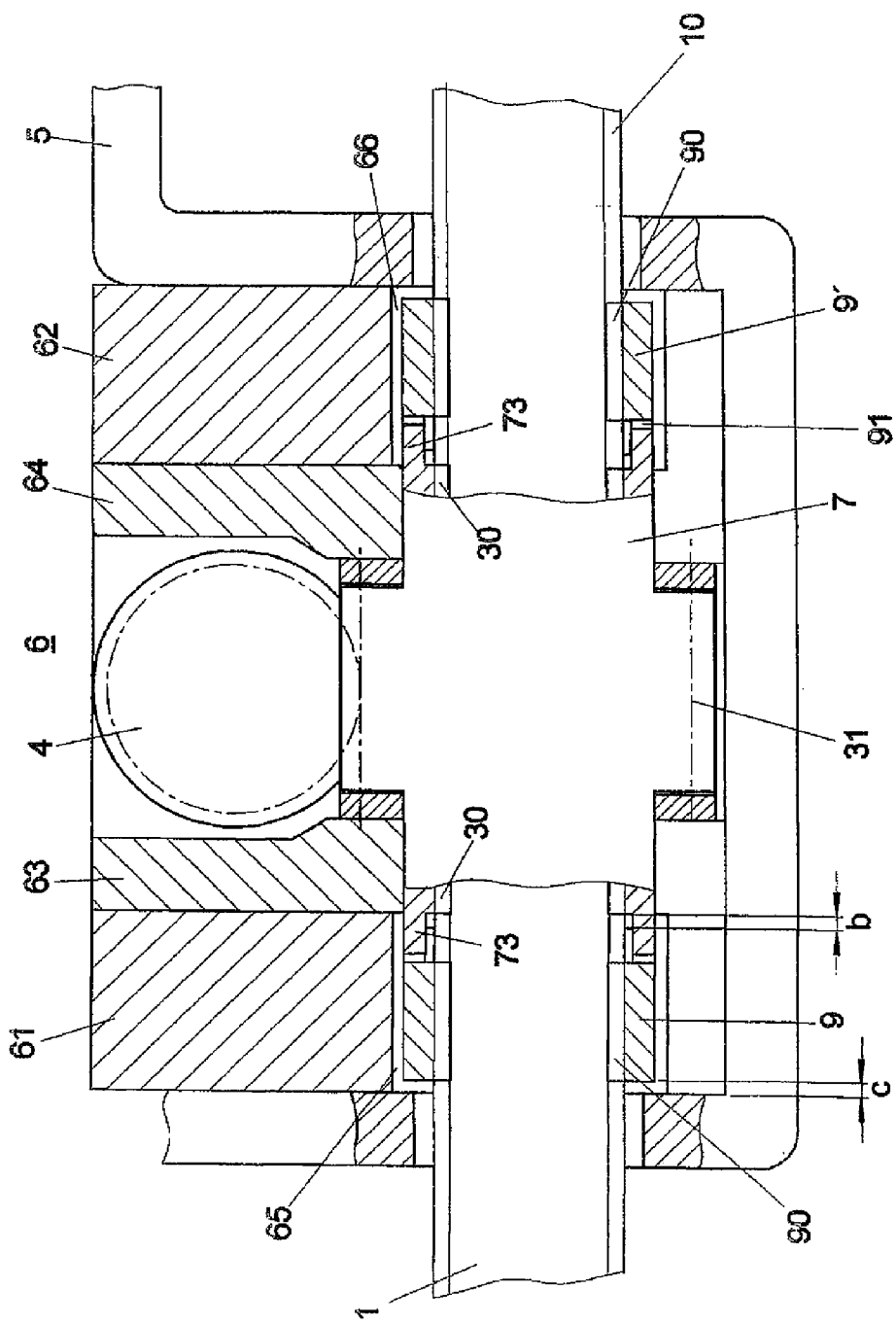
FIG. 8 shows a partial longitudinal section through a spindle drive with a hybrid spindle nut with a central functional part and two strengthening parts according to FIGS. 6 and 7.

In FIGS. 6 to 8 a second embodiment according to the invention is illustrated in a perspective view, a side view and in a longitudinal section through the adjusting mechanism 2 according to FIG. 1, wherein in said second embodiment instead of a thread play between the internal toothing of the at least one strengthening part and the external thread of the spindle an axial distance between the front faces of the functional part and the front faces of the strengthening parts facing these front faces of the functional part as well as an axial distance between the front faces of the strengthening part and the bearing blocks of the transmission housing of the adjusting mechanism or the fixing bracket is provided, while the internal toothing of the strengthening part meshes with the external thread of the spindle.

FIG. 6 shows in a perspective view and in FIG. 7 in a side view the hybrid spindle nut consisting of a functional part 7 and two strengthening parts 9, 9'. The axis of the functional part 7 is mounted in the bearing blocks 63, 64 of the transmission housing 6 according to FIG. 2 and comprises front face ends, on which projections 73 and slots 74 being there between are formed, which are interlocked with corresponding projections 91 and slots 92 of the strengthening parts 9, 9' being formed as thread nuts. The strengthening parts 9, 9' comprise an internal toothing 90, which meshes in an assembled state with the external thread 10 of the spindle 1 according to FIG. 1.

The front face ends of the functional part 7 have a distance b to the front face ends of the projections 91 of the strengthening parts 9, 9', which in an assembled state under normal operation of the spindle drive have a distance c to the front face of the bearing blocks 63, 64 (FIG. 7) or the fixing bracket 5 (FIG. 8).

The projections 73, 91 on the front faces of the functional part 7 or the strengthening part 9, 9' are arranged evenly distributed on the circumference and are formed according to the kind of dove-tail guide, that means they have a wedge-like structure which allows in circumferential direction a form-fit connection between the projections 73, 91 or slots 92, 74, which are movable to each other in axial direction due to the mutual front face distance so that under normal operation no axial forces are transferred from the functional part 7 to the strengthening part 9, 9'. The projections 73, 91 and slots 92, 74 serve as carrier under normal operation of the spindle mechanism such that a rotational movement of the functional part 7 introduced into the spindle toothing by the driving worm 4 according to FIG. 2 leads to a pulling of the strengthening parts 9, 9' without that an adjusting force is transferred to the strengthening parts 9, 9'. The strengthening parts 9, 9' move along thus without force transmission and thus without noteworthy frictional force under normal operation, that means the internal toothing 90 thereof moves on the external thread 10 of the spindle 1 according to FIG. 1 without that an adjustment force is thereby transferred.

FIG. 8 shows in a longitudinal section through the adjusting mechanism according to FIG. 1 the second embodiment in an assembled state.

The functional part 7 of the hybrid spindle nut 3 made of plastic carries the internal toothing 30 meshing with the external thread 10 of the spindle 1 as well as the external toothing 31 meshing with the worm toothing of the driving worm and is mounted in the bearing bores 65, 66 of the bearing blocks 63, 64 of the transmission housing 6 of the adjusting mechanism 2 housed by the housing shelves 61, 62 of the transmission housing 6. The transmission housing 6 is arranged in the fixing bracket 5 made of a high stable material, preferably metal, which is connected to the adjustment rail of the longitudinal seat adjustment of the motor vehicle seat.

The strengthening parts 9, 9' are arranged on both front faces of the functional part 7, the internal toothing 90 thereof meshes with the external thread 10 of the spindle 1, that means in contrast to the first embodiment described by means of FIG. 5, the internal toothing 90 has no distance from the external thread 10 of the spindle 1 and thus no thread play.

The projections 73 of the functional part 7 illustrated in FIGS. 6 and 7 are deducible on the each other opposing front faces of the functional part 7, wherein said projections engage in slots of the strengthening part 9, as well as the projections 91 of the strengthening parts 9, 9', which engage with the slots on the front faces of the functional part 7.

The projections and slots of the functional part 7 and the strengthening parts 9, 9' serve as carrier, through which during a rotational movement of the functional part 7 introduced by the drive mechanism of the spindle drive via the driving worm the strengthening parts 9, 9' are moved along in the respective rotational direction so that these are moved during an adjustment movement of the adjusting mechanism 2 according to FIG. 1 along the spindle 1 with the functional part 7.

The ends of the projections 91 of the strengthening parts 9, 9' have in the assembled state a distance b from the front face of the functional part 7 and on the opposite front face of the strengthening parts 9, 9' a distance c to the fixing bracket 5. Due to this axial play of the strengthening parts 9, 9' in respect to the functional part 7 as well as in respect to the fixing part 5 it is ensured that under normal operation no adjustment forces are transferred onto the strengthening parts 9, 9', so that in axial direction no loading is exerted onto the strengthening parts 9, 9' and due to a missing frictional resistance no reduction of the efficiency or the force transfer occurs. Solely in case of the modification of the strengthening parts 9, 9' as metallic parts a low noise development can occur due to the internal toothing 90 of the strengthening parts 9, 9' meshing with the external thread 10 of the spindle 1, which is however very low due to the missing axial loading. In case of a different material selection for the strengthening parts 9, 9' such a noise development can be completely avoided.

In case of an impact the internal toothing 30 of the functional part 7 of the hybrid spindle nut 3 being coated with a plastic or consisting of plastic deforms, so that depended on the direction of the occurring impact force the distances b and c of the front faces of the respective strengthening part 9 or 9' from the front face of the functional part 7 or the fixing bracket 5 are bypassed and the impact force acting on the functional part 7 is transferred to the respective strengthening part 9 or 9', the internal toothing 90 thereof being engaged with the external thread 10 of the spindle 1 grips into the external thread 10 of the spindle 1, wherein the material properties of the strengthening parts 9, 9' guarantee that no or no essential deformation of the internal toothing 90 of the respective strengthening part 9 or 9' occurs and thus it is ensured that the hybrid spindle nut 3 does not "slide through" in longitudinal direction of the spindle 1. Thus, it is guaranteed that the adjusting mechanism 2 connected to the adjustment rail of the longitudinal seat adjustment of the motor vehicle seat according to FIG. 1 is not adjusted unintentionally on the spindle 1 in longitudinal direction of the spindle 1.

Figure 9:
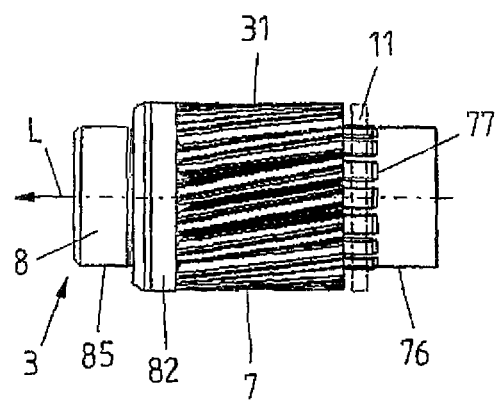
FIG. 9 shows a view of a spindle nut consisting of a functional part calving an external toothing and an internal toothing and a strengthening part for diverting forces.
Figure 10:
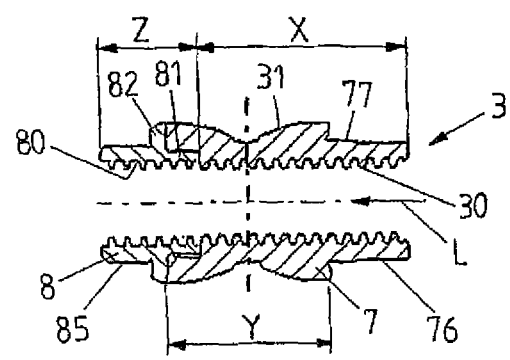
FIG. 10 shows a cross section of the spindle nut according to FIG. 9.

FIGS. 9 and 10 show an embodiment of the spindle nut 3 which consists of a functional part 7 carrying the external toothing 31 and the internal tooting 30 and a strengthening part 8 applied on one side on the functional part 7. The strengthening part 8 engages thereby via a cylindering-shaped projection 81 in a cup-shaped deepening 71 (see FIG. 11B) of the functional part 7 and is for instance glued or welded to the functional part 7.

Components of the same function shall also be provided in this embodiment with the same reference sign if suitable.

The strengthening part 8 comprises an internal toothing 80, the teeth thereof, as clearly obvious from FIG. 11, are formed slimmer than the teeth of the internal toothing 30 of the functional part 7 and are separated in an operational state of the spindle nut 3 from the external thread 10 of the spindle 1. With other words, the tooth flanks of the teeth of the internal toothing 80 of the strengthening part 8 have in the operational state a distance to the tooth flanks of the external thread 10 of the spindle 1 so that the internal toothing 80 of the strengthening part 8 is not engaged with the external thread 10 of the spindle 1. The strengthening part 8 is thus rotated under operation of the spindle mechanism together with the functional part 7 without being thereby in abutment against the external thread 10 of the spindle 1 and thus not contributing to the friction of the spindle nut 3.

The strengthening part 8 rests via a flange 82 against a front face 34 of the functional part 7 and comprises a cylindrical bearing collar 85 via which and via a bearing collar 76 formed on the functional part 7 the spindle nut 3 is mounted on the bearing bores 65, 66 of the bearing blocks 63, 64.

The strengthening part 8 is, as previously described, made of a different, in particular more stable material as the functional part 7. The strengthening part 8 can be for instance made of a hard metal, while the functional part 7 is produced completely or at least partially of a plastic. The strengthening part 8 serves to increase the strength of the spindle nut 3 and to prevent during larger loading forces, in particular in the case of an impact a sliding through of the spindle nut 3 by bringing the internal toothing 80 of the strengthening part 8 in abutment with the external thread 10 of the spindle 1 in a gripping manner.

Spacer ribs 77 extending axially along the longitudinal direction L of the spindle 1 are formed additionally on the bearing collar 76 of the functional part 7, wherein said ribs serve for the mounting of a thrust washer 11, which are arranged loosely or not torque-proof on the functional part 7 in order to support the functional part 7 with an end side front face 33 (FIG. 11) sliding on the assigned bearing block 63, 64 in longitudinal direction L.

As apparent from FIG. 10, the length X of the internal toothing 30 of the functional part 7 being engaged with the external thread 10 of the spindle 1 is larger than the length Z of the internal tooting 80 of the strengthening part 8 and in particular also larger than the length Y of the external tooting 31 of the functional part 7. The internal toothing 30 extends thus in longitudinal direction L over a larger length X than the external toothing 31, what increases the stability of the spindle nut 3 in respect to a sliding through in longitudinal direction L.

Basically two strengthening parts 8 can here be used on both sides of the functional part 7. In this case the length X of the internal toothing 30 would be shorter than the length Y of the external toothing 31.

Figure 11A:
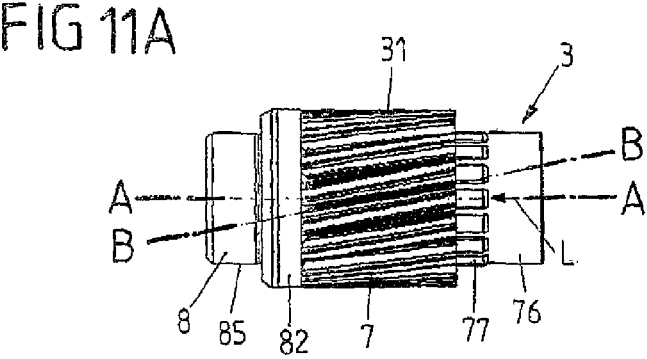
FIG. 11A shows a side-view of the spindle nut according to the view in FIG. 9.
Figure 11B:
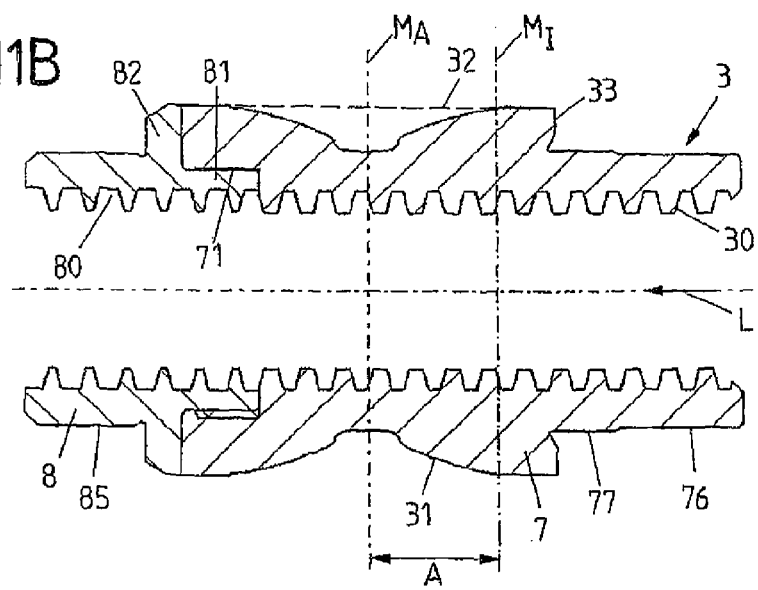
FIG. 11B shows a sectional view of the spindle nut along the line A-A according to FIG. 11A.

As apparent from FIG. 10 and FIG. 11B a central plane MA of the external toothing 31 and a central plane MI of the internal toothing 30 are separated from each other in longitudinal direction L with a distance A. With other words, the points of gravity of the external tooting 31 and the internal toothing 30 are apart from each other in longitudinal direction L, whereby an asymmetrical spindle nut 3 with asymmetrical force introduction into the spindle 1 is provided. While the force from the driving worm 4 via the external toothing 31 occurs in the point of gravity in the central plane MA, the force is transferred via the internal toothing 30 in the point of gravity in the central plane MI onto the spindle 1.

As apparent from FIG. 10 and FIG. 11B the internal toothing 30 extends thereby into the area of the bearing collar 76 and thus axially beyond the external toothing 31.

The asymmetrical formation of the spindle nut 3 with internal toothing 30 shifted axially to the external toothing 31 allows the use on the one hand of the strengthening part 8 with a internal toothing 80 arranged thereon and separated in an operational state and on the other hand a long internal toothing 30 for transferring adjustment forces.

The external toothing 31 on the functional part 7 is formed as a helical toothing with teeth, which are directed diagonal to the longitudinal direction L. Thus, the teeth, as illustrated in FIG. 11A, are directed with their tooth base along the line B-B. The external toothing 31 is thereby formed such that it extends from the front face 33 being on the right side in FIGS. 11A to 11C to the other front face 34, wherein the external toothing 31 begins directly at the front face 33, however runs out towards the other front face 34.

Figure 11C:
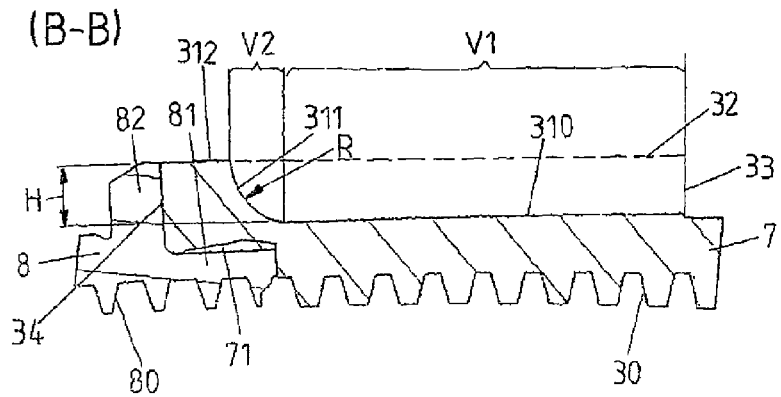
FIG. 11C shows a sectional view of the spindle nut along the line B-B according to FIG. 11A.

The meaning of this is illustrated in FIG. 11C illustrating a sectional view of a section of the spindle nut 3 along the line B-B by the means of the progression of the tooth base of a tooth of external toothing 31. The external toothing is divided in longitudinal direction L in two toothing sections V1, V2, of which the one toothing section V1 is formed with a cylindrical toothing and the second toothing section V2 is formed with a toothing with a continuously decreasing tooth depth H. The toothing in toothing section V1 can for instance be formed with an involute profile, while in toothing section V2 a globoid toothing is provided with a tooth depth H decreasing towards the front face 34. The external toothing 31 is thereby formed by deepenings pointing radially inwards in a cylindrical mantle surface 32 of a central section of the functional part 7, wherein the tooth depth H is constant in the toothing section V1 and decreases in the toothing section V2 in direction to the front face 34.

If the external toothing 31 is formed in the area of the toothing section V2 as a globoid toothing, the tooth base 311 of each teeth is curved in this toothing section V2 with a radius R, which is larger than the tooth depth H. The tooth depth H is reduced in this toothing section V2 until zero so that a toothing-free end section 312 is adjacent to the toothing section V2, wherein said end section delimits laterally the external toothing 31.

The external toothing 31 can also be formed in the area of the toothing section V2 as a toothing with a radius R levelling off, which is smaller or equal to the maximal tooth depth H. In this case the tooth base 311 is curved in this toothing section V2, in particular in order to reduce notch stresses at the crossing from (cylindrical) toothing section V1 into the toothing-free end section 312.

Since the toothing section V1 extends until the front face 33, the external toothing 31 is open on the front face 33. This allows for a simple production of the functional part 7 of the spindle nut 3 by injection moulding. This is because that for the moulding the functional part 7 can be removed in a simple manner along the longitudinal direction L out of an injection moulding device. This allows for a production of the functional part 7 with external toothing 31 arranged thereon in a single working step without using sliders to form the external toothing 31.

Due to the sectional formation of the external toothing 31 as globoid toothing the stability of the external toothing 31 can be additionally set up for an advantageously force transfer from the driving worm 4 to the spindle nut 3. Due to the globoid toothing the external toothing 31 is adapted at least sectionally to the toothing 40 (in form of a worm thread) of the driving worm 4 so that a advantageously even abutment of the toothing 40 of the driving worm 4 with the tooth flanks of the external toothing 31 of the spindle nut 3 is provided.

The vehicle seat is kept in the longitudinal direction L, along which the spindle 1 extends, via the adjusting mechanism 2 at the spindle 1. The adjusting mechanism 2 has to be designed therefore such that it can absorb the loading forces, in particular the forces introduced from the adjustment rail 91 during an impact, in a suitable manner such that a sliding through of the vehicle seat is prevented during an impact in order to exclude a sudden adjustment of the vehicle seat and injuries of a vehicle occupant resulting therefrom.

The connection of the adjusting mechanism 2 to the upper adjustment rail 91 must have therefore a sufficient stability. Furthermore, the connection should also have a sufficient large stiffness, in particular during a frontal impact in order to avoid a forward travel of a belt linking point holding a seat-belt, and to absorb stiffly the forces acting during a frontal impact. If, however, the linking is to stiff, this can have the consequence during a rear end impact that the acting impact forces are transferred directly onto the vehicle occupant and can lead to an abrupt back travel of the vehicle occupant, in particular of its head. In order to avoid hereby injuries of the vehicle occupant, for instance a whip lash, it is desirable at least to dampen such back travel.

FIG. 12 shows a modification of a spindle mechanism, in which a strengthening part 24 is provided for a one-sided support of the adjusting mechanism 2 in respect to the adjustment rail 91, wherein said strengthening part is formed and provided to absorb the forces F acting in the longitudinal direction L of the spindle 1 onto the adjusting mechanism 2 and to support the adjusting mechanism 2 during the acting of the forces in this longitudinal direction L. The idea in case of such a strengthening part 24 is to provide a one-sided support of the adjusting mechanism 2 in respect to the adjustment rail 91 through which it is achieved that during the action of forces in the longitudinal direction L the adjusting mechanism 2 and its connection to the adjustment rail 91 cannot be deformed, thus the connection comprises a high stiffness. The longitudinal direction L corresponds hereby to the vehicle longitudinal direction and is directed in direction of a headway operation of the vehicle such that via the strengthening part 24 the forces F generated during a frontal impact due to the inertia of the vehicle seat and a vehicle occupant are supported and the adjusting mechanism 2 is kept during a frontal impact in a stiff manner.

In case of an opposite acting force against the longitudinal direction L the adjusting mechanism 2 is on the other hand not supported so that the adjusting mechanism 2 can deform at least by a small distance and within the meaning of a crash zone, the forces acting during an impact are not directly and stiffly transferred. During a rear end impact, in which the forces act against the longitudinal direction L onto the adjusting mechanism 2, the adjusting mechanism 2 and its connection to the adjustment rail 91 can thus deform without this is being prevented by the strengthening part 24 so that at least a part of the energy in case of an impact is absorbed in the adjusting mechanism 2 and its connection.

An application of a strengthening part 24 is in particular meaningful in combination with a spindle nut 3 in form of a hybrid spindle nut of the previously mentioned kind. The spindle nut 3 provides hereby a sufficiently tight connection also in case of an impact so that in particular during a frontal impact, during which the fixing bracket 5 is not deformed due to the action of the strengthening part 14 and thus the arms 51, 52 cannot engage with the spindle 1 in a gripping manner, the acting impact forces can be diverted via the spindle nut 3 without that a sliding through of the spindle nut 3 occurs. The spindle nut 3 is for this reason supported via the strengthening part 8 by the spindle 1 so that a sliding through is prevented.

It is of an advantage, when using a spindle nut 3 with only one (one-sided) strengthening part 8, the strengthening part 8 is arranged on the side of the spindle nut 3 facing towards the strengthening part 24.

The strengthening part 24 being formed for instance as a cold extruded part is applied on the fixing bracket 5 in longitudinal direction L behind the adjusting mechanism 2. The strengthening part 24 can be pressed onto the fixing bracket 5 or can be screwed also via a screwing connection reaching through the fixing point 58 to the fixing part 5 and to the adjustment rail 91.

Figure 13:
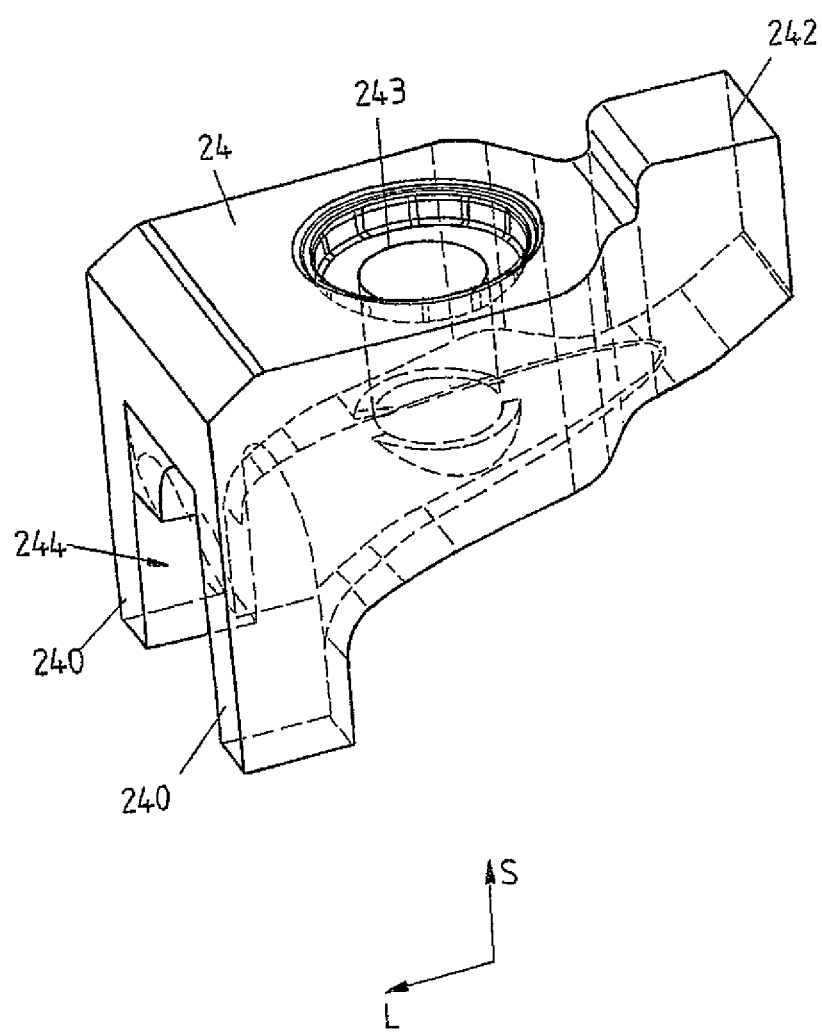
FIG. 13 shows a perspective view of the strengthening part.

An enlarged perspective view of the strengthening part 24 is shown by FIG. 13. The strengthening part 24 comprises in cross section to the longitudinal direction L a U-shape with two lateral arms 240, which extend in parallel planes being spanned by the longitudinal direction L and the vertical direction S and leave a recess 244 between them through which the spindle 1 extends in an operational position (see FIG. 12). The arms 240 taper against the longitudinal direction L and run into an end side block 242, which rests in the assembled state of the adjusting mechanism 2 against the adjustment rail 91. A through opening 243 is arranged centrally on the strengthening part 24, wherein said opening is aligned in the position as intended of the strengthening part 24 with the fixing point 58 (FIG. 12) and via which the strengthening part 24 can be for instance connected via a screwing connection to the fixing bracket 5 and the adjustment rail 91.

Figure 14A:
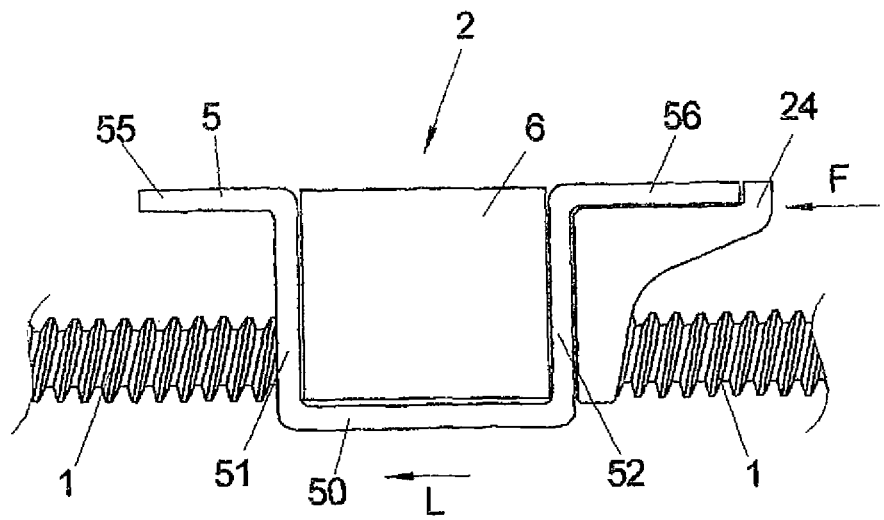
FIG. 14A shows a schematic view illustrating the supporting action of the strengthening part during a frontal impact.

The arms 240 of the strengthening part 24 form lateral supporting ribs for supporting forces F acting in the longitudinal direction L. Since the arms 240 forming the supporting ribs extend parallel to the longitudinal direction L and to the vertical direction S, the forces F acting in the longitudinal direction L are introduced into the plane of the arms 240. By resting the fixing bracket 5 with its lateral arm 52 against the strengthening part 24 the fixing bracket 5 and thus the adjusting mechanism 2 are supported in case of forces F introduced in the longitudinal direction L from the adjustment rail 91 into the adjusting mechanism 2 and can thus not deform so that a stiff connection of the adjusting mechanism 2 to the adjustment rail 91 is provided. This is shown FIG. 14A: When forces F acting in the direction L the fixing bracket 5 cannot be deformed due to the supporting action of the strengthening part 24. This corresponds to the situation during a frontal impact, during which thus a stiff connection of the adjusting mechanism 2 to the adjustment rail 91 and thus a stiff connection of the body mounted rail 92 to the adjustment rail 91 is provided.

Figure 14B:
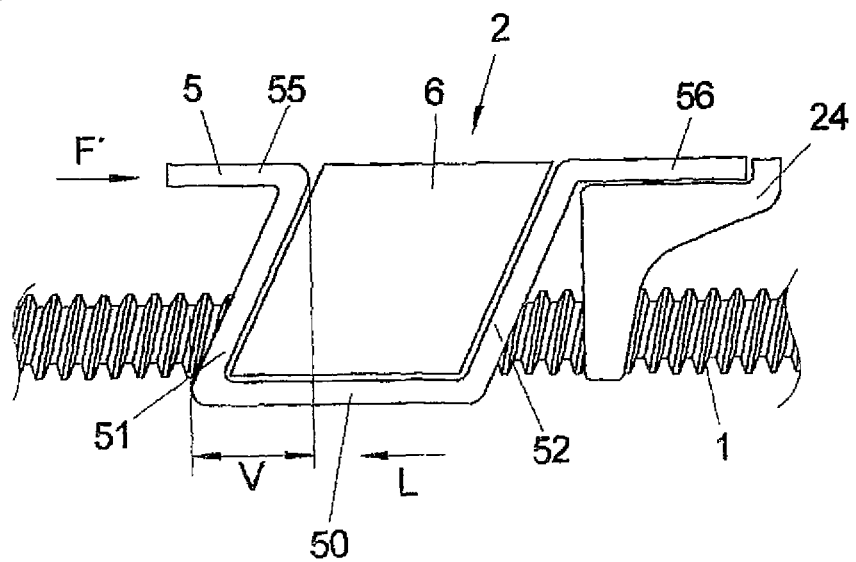
FIG. 14B shows a schematic view illustrating the deformation of an adjusting mechanism and a fixing bracket holding the adjusting mechanism during a rear end impact.

In case of an opposite acting force during a rear end impact, during which forces act against the longitudinal direction L onto the adjusting mechanism 2, the strengthening part 24 remains in contrast unloaded and does not act supportive to the fixing bracket 5. This is shown in FIG. 14B: If forces F' act against the longitudinal direction L onto the adjusting mechanism 3 due to the inertia of the vehicle seat and the vehicle occupant during a rear end impact then the fixing bracket 5 can deform in the shown manner by inclination of the arms 51, 52.

Since the strengthening part 24 is arranged in direction of the acting force F' behind the adjusting mechanism 2, the strengthening part 24 cannot counteract such a deformation. The upper adjustment rail 91 connected to the fixing bracket 5 and the lower, body-fixed rail 92 connected to the spindle 1 can thus be shifted towards each other by a displacement V. The adjusting mechanism 2 and the fixing bracket 5 serve in this case as a kind of crash zone and absorb a part of the impact energy as deformation energy in order to dampen in this manner forces transferred to a vehicle occupant and in particular to weaken an abrupt back travel of a vehicle occupant during a rear end impact, which could possibly lead to a whip lash.

What is claimed is:

1. A spindle drive for longitudinally adjusting a motor vehicle seat comprising
    an adjustment rail being longitudinally adjustable relative to a body mounted rail and
    an adjusting mechanism including spindle comprising an external thread, a driving worm comprising a first external toothing and connected to a driving device and a spindle nut comprising a second external toothing and an internal toothing, the second external toothing of the spindle nut engaging with the first external toothing of the driving worm and the internal toothing of the spindle nut engaging with the external thread of the spindle,
    wherein the spindle nut is formed by a hybrid spindle nut comprising a functional part arranged in the force flux between the driving worm and the spindle and at least one strengthening part deflecting crash forces from the adjustment rail into the spindle,
    wherein the spindle nut is formed in at least one centre section cylindrically with an external cylindrical mantle surface and two front faces laterally delimiting the cylindrical mantle surface, wherein the external toothing of the spindle nut is formed by recesses pointing radially inwards in the outer cylindrical mantle surface of the spindle nut, wherein the external toothing extends from a first front face along the cylindrical mantle surface towards another, second front face with a tooth depth decreasing towards the second front face, and
    wherein the internal toothing of the spindle nut is shifted in longitudinal direction to the external toothing of the spindle nut such that a central plane of the external toothing continuing vertical to the longitudinal direction is spaced apart to a central plane of the internal toothing.

2. The spindle drive according to claim 1, wherein the external toothing is laterally open at the first front face.

3. The spindle drive according to claim 1, wherein the tooth depth decreases continuously or in discrete steps.

4. The spindle drive according to claim 1, wherein the external toothing of the spindle nut comprises in longitudinal direction at least two different toothing sections, of which a first toothing section comprises a cylindrical toothing with a constant tooth depth and a second toothing section comprises a non-cylindrical toothing with a tooth depth decreasing in direction towards the second front face.

5. The spindle drive according to claim 1, wherein the external toothing of the spindle nut is formed at least partially as globoid toothing, the tooth thereof are adapted to the external toothing of the driving worm and the tooth depth thereof decreases in direction to the second front face.

6. The spindle drive according to claim 1, wherein the spindle nut comprises on the second front face an end section without external toothing, wherein the tooth depth of the external toothing decreases in direction to the end section.

7. The spindle drive according to claim 1, wherein the external toothing on the first front face is not delimit by an end section so that the external toothing is laterally open on the first front face.

8. The spindle drive according to claim 1, wherein the external toothing of the spindle nut is formed as a spur toothing, the tooth thereof are directed along the longitudinal direction, or a helical toothing, the tooth thereof are directed angular to the longitudinal direction.

9. The spindle drive according to claim 1, wherein the internal toothing of the spindle nut comprises in longitudinal direction a larger length as the external toothing of the spindle nut.

10. The spindle drive according to claim 1, wherein the spindle nut comprises a bearing collar formed on the first front face and that the internal toothing of the spindle nut extends axial beyond the external toothing of the spindle nut into the bearing collar.

* * * * *